April 13, 1926.

T. W. JONES

MARKER

Filed Nov. 19, 1924

Inventor
T. W. Jones.

By Lacy & Lacy, Attorneys

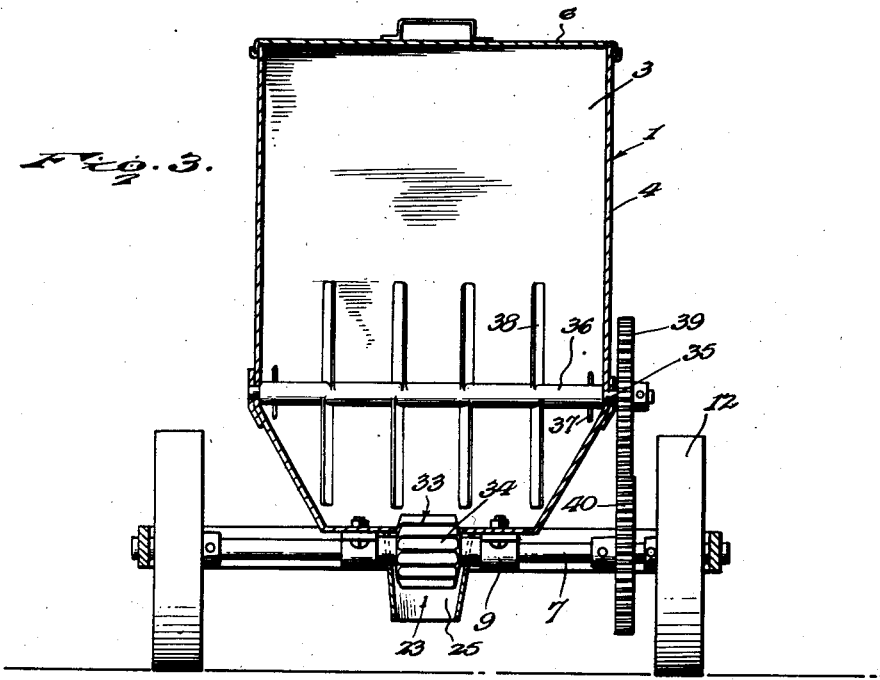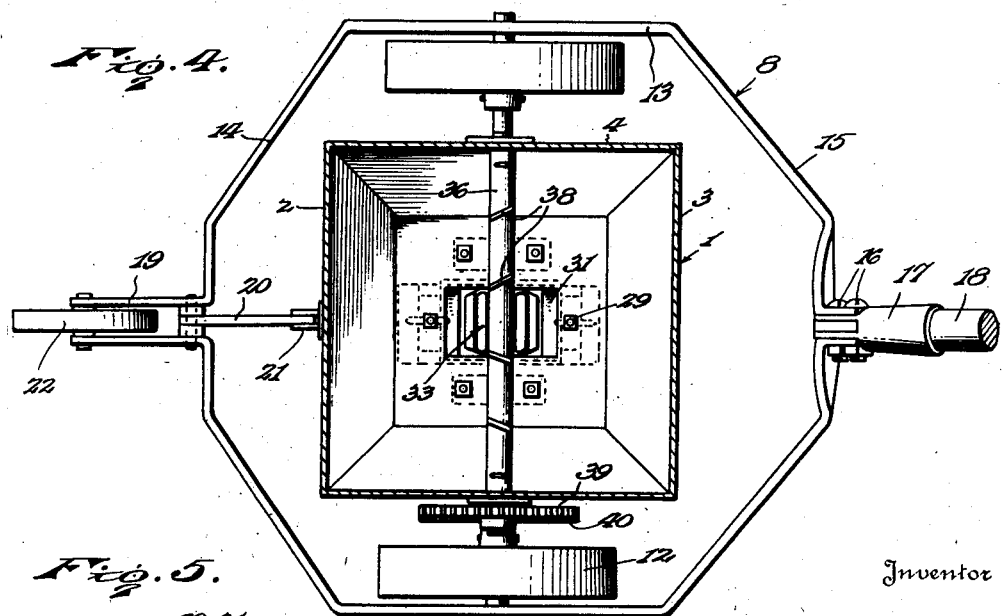

Patented Apr. 13, 1926.

1,580,303

UNITED STATES PATENT OFFICE.

THOMAS W. JONES, OF EXCELSIOR SPRINGS, MISSOURI.

MARKER.

Application filed November 19, 1924. Serial No. 750,942.

*To all whom it may concern:*

Be it known that I, THOMAS W. JONES, a citizen of the United States, residing at Excelsior Springs, in the county of Clay and State of Missouri, have invented certain new and useful Improvements in Markers, of which the following is a specification.

This invention relates to improvements in markers and more particularly to a machine for distributing lime in lines over a tennis court, and baseball and football fields.

One of the objects of the present invention is to provide a marker so constructed and operated in such a manner as to effect thorough disintegration of any lumps of lime present in the hopper of the machine and thus deposit the lime in a finely powdered state so that the distribution of the lime will be more even than if no means were provided for accomplishing this result.

Another object of the invention is to provide a marking machine so constructed that, by reason of a novel arrangement of the ground engaging wheels thereof, the operation of the machine may be stopped and the machine still moved over the ground surface, by a mere tilting of the machine as a whole, so that in turning corners or moving the machine from place to place, this may be readily accomplished without distribution of lime therefrom.

Another object of the invention is to provide means whereby the delivery of the lime from the delivery spout of the hopper of the machine may be regulated as deemed expedient.

In the accompanying drawings:

Figure 3 is a vertical transverse sectional view through the machine, taken substantially on the line 3—3 of Figure 1, looking in the direction indicated by the arrows.

Figure 4 is a horizontal sectional view taken substantially on the line 4—4 of Figure 1, looking in the direction indicated by the arrows.

Figure 5 is a detail vertical transverse sectional view on the line 5—5 of Figure 2, looking in the direction indicated by the arrows.

Figure 1:
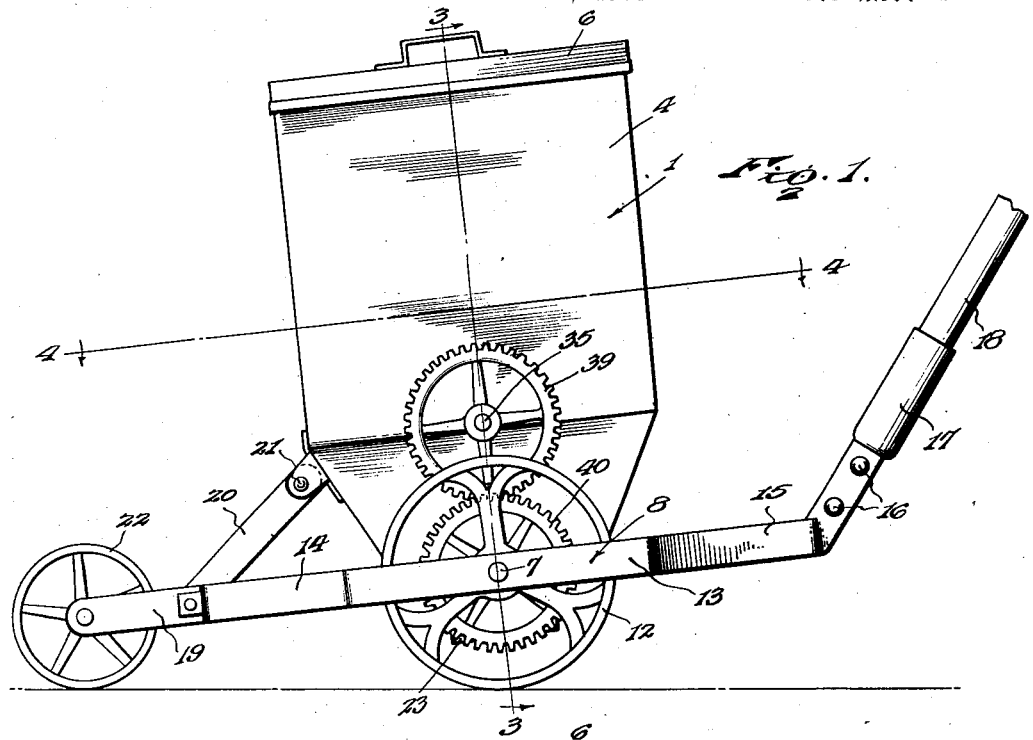
Figure 1 is a view in side elevation, of the marking machine embodying the present invention.

The marking machine embodying the invention comprises a hopper which is indicated in general by the numeral 1 and which is preferably formed of sheet metal and comprises front, rear, and side walls, indicated respectively by the numerals 2, 3 and 4, the said walls being inclined in downwardly converging planes at their lower portions so that the hopper at its bottom is somewhat restricted in its internal dimensions to concentrate the lime for delivery to the spout of the hopper, which is indicated by the numeral 5. The hopper is closed at its top by a removable lid or cover indicated by the numeral 6. The numeral 7 indicates a shaft which is rotatably journaled at its ends in the side members of the supporting frame of the machine which is indicated in general by the numeral 8 and which will presently be more specifically described. Bearings 9 are secured to the under side of the bottom 10 of the hopper 1 at opposite sides of the discharge opening in the said bottom, which is indicated by the numeral 11, and the said shaft 7 is likewise rotatably journaled in these bearings and extends across the upper end of the delivery spout 5, as clearly shown in Figure 3 of the drawings. Ground wheels 12 are fixed upon the shaft 7 immediately inwardly of the side members of the frame 8 and it will be evident at this point that when the machine is moved over the ground surface, rotary motion will be imparted to the said shaft.

The frame 8 is preferably formed from two pieces of bar metal suitably bent to provide the sides of the frame which are indicated by the numeral 13, and front and rear frame portions indicated by the numerals 14 and 15. The rear frame portions 15 are secured together by bolts 16 which likewise anchor to this portion of the frame, a socket member 17 into which is fitted the lower end of a handle 18, through the medium of which the machine may be propelled over the ground surface. The forward frame portions 14 are brought together and provided with spaced parallel forward extensions 19 between which is secured the lower end of a brace bar 20 which is inclined upwardly and rearwardly from it said end and secured at its upper end to a bracket 21 upon the front wall 2 of the hopper, so that the hopper is supported upon the shaft 7 and braced against any tilting movement, by the said brace bar 20. Journaled for rotation between the forward end portions of the extensions 19 is a third ground wheel indicated by the numeral 22, and at this point it is to be observed that so long as the ground wheels 12 heretofore described, are in contact with the ground surface and the machine is being propelled over the surface, rotary motion will be imparted to the shaft 7 to actuate the lime delivering means which will presently be more specifically described while, on the other hand, if the machine is slightly tilted forwardly to bring the ground wheel 22 into engagement with the ground surface and elevate the wheels 12, no lime will be delivered from the machine and the machine may be propelled or trundled from place to place without wasting any of the lime. Therefore, it is unnecessary to throw the delivery mechanism into and out of operation by some mechanical means, when the machine is being moved from place to place or in turning corners or traversing some portion of the field or court where it is not desired to deposit lime, it being only necessary for the user to slightly lift up upon the handle of the machine in order to discontinue the delivery of lime therefrom.

The discharge spout 5 of the hopper comprises side walls 23 and front and rear walls 24 and 25, and the upper end of the hopper is disposed in substantial registration with a discharge opening 26 which is formed in the bottom 10 of the said hopper, the upper edges of the side walls 23 of the delivery or discharge spout engaging against the under side of the bottom 10, and the front and rear walls 24 and 25 of the spout being provided respectively with forwardly and rearwardly right angularly extending flanges 27 and 28. Bolts 29 are secured through openings in the flanges 27 and 28 and extend through slots 30 which are formed in the valve plates 31 disposed between the under side of the bottom 10 of the hopper and the upper sides of the flanges 27 and 28, it being understood that by loosening the bolts 29, the valve plates may be adjusted toward or away from each other so as to more or less restrict the open upper end of the spout, the relatively adjacent edge portions of the valve plates extending into the said open upper end of the spout. The valve plates are provided with depending finger pieces 32 whereby they may be conveniently adjusted when the bolts 29 are loosened.

Figure 2:
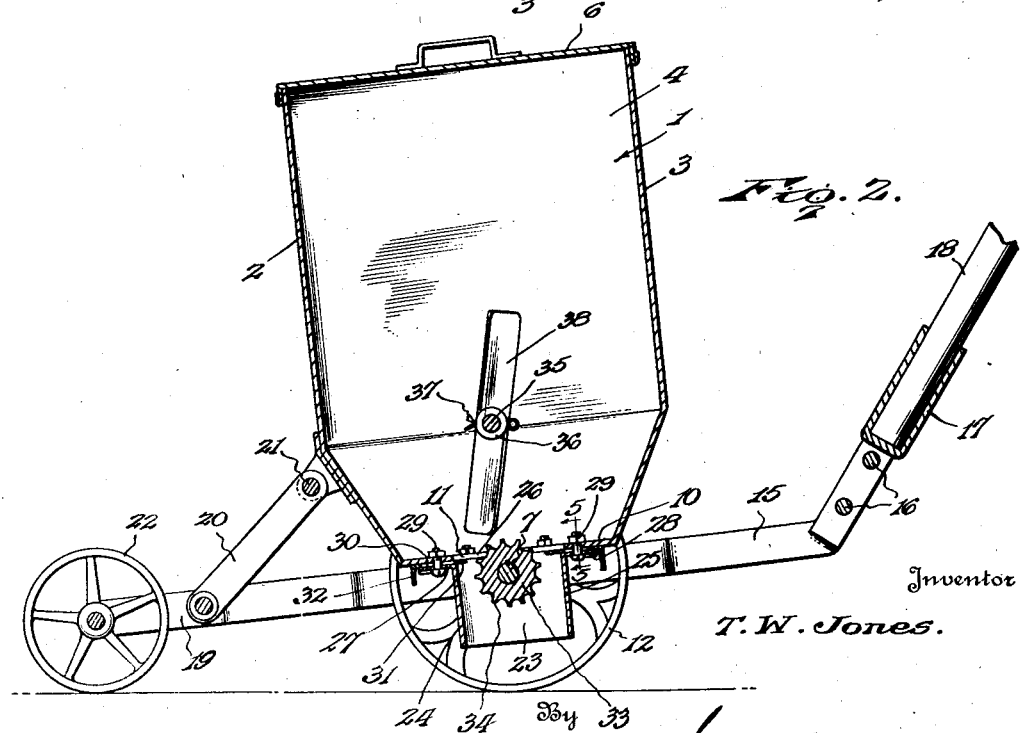
Figure 2 is a vertical front to rear sectional view therethrough.

The numeral 33 indicates a feed roll which is fixed upon the shaft 7 between the bearings 9 and has a corrugated periphery 34, the channels between the ridges of the corrugations serving to collect powdered lime from the hopper and deliver the same to the spout in the rotation of the roll. By reference to Figure 2, it will be observed that by adjusting the valve plates 27 and 28, the relatively adjacent edges of these plates may be brought into more or less close proximity to the surface of the roll 33, to regulate the feed of the lime from the hopper.

The numeral 35 indicates a shaft which is rotatably journaled in the opposite side walls 4 of the hopper a suitable distance above and parallel to the shaft 7, and a sleeve 36 is fitted to the shaft 35 and held for rotation therewith by cotter pins 37 or other suitable fastening or keying elements. The sleeve 36 carries a plurality of disintegrating blades 38 preferably arranged in two series at opposite sides of the longitudinal center of the sleeve 36, the blades of the two series being relatively oppositely obliquely disposed, as clearly shown in Figures 3 and 4 of the drawings. A gear 39 is fixed upon one end of the shaft 35 and meshes with a gear 40 which is fixed upon the shaft 7 inwardly of one of the ground wheels 12, and it will now be evident that as the ground wheels 12 travel over the ground surface, rotary motion will be transmitted from the shaft 7 to the shaft 35 causing rotation of the blades 38 to thoroughly break up and disintegrate any lumpy particles of lime within the hopper and, at the same time, due to the oblique disposition of the blades, feed the lime toward the center of the hopper. In this manner, the finely powdered lime is delivered to the feed roll 33 and, in turn, delivered thereby through the spout 5 to the ground surface over which the machine is propelled.

By reference to Figure 5 of the drawings, it will be observed that each valve plate 31 is provided at its lateral edges with tongues 31' which are bent to extend over the corresponding end edges of the flanges 27 or 28, as the case may be, and beneath the said flanges so that, due to the sliding engagement of these tongues with the end edges of the respective flanges, the valve plates 31 are guided at the time they are adjusted and thus maintaind with their relatively adjacent edges in parallelism.

It will be observed from the drawings, that inasmuch as the hopper is supported, by the bearings 9, directly upon the shaft 7, and braced with relation to the frame 8, through the medium of the brace bar 20, the necessity of providing independent supporting means between the frame and hopper is entirely obviated, and the cost of manufacture of the machine is correspondingly reduced.

Having thus described the invention, what I claim is:

1. In a marking machine, a frame, a shaft rotatably journaled in the frame, means for rotating the shaft, a hopper supported above the frame, a discharge spout leading from the bottom of the hopper, and having forwardly and rearwardly disposed flanges at its upper end, the said shaft extending across the upper portion of the said spout and the bottom of the hopper having an opening communicating with the upper end of the spout, a feed roll fixed upon the shaft within the said upper portion of the spout and the opening in the bottom of the hopper, and valve plates adjustably mounted upon the flanges at the upper ends of the spout and between the upper end of the spout and the bottom of the hopper in front and in rear of the said feed roll and adjustable toward and from the said roll.

2. In a marking machine, a frame, a shaft rotatably journaled in the frame, means for rotating the shaft, a hopper supported above the frame, a discharge spout leading from the bottom of the hopper, the said shaft extending across the upper portion of the said spout and the bottom of the hopper having an opening communicating with the upper end of the spout, a feed roll fixed upon the shaft within the said upper portion of the spout and the opening in the bottom of the hopper, valve plates adjustably mounted between the upper end of the spout and the bottom of the hopper in front and in rear of the said feed roll and adjustable toward and from the said roll, the said spout having forwardly and rearwardly extending flanges respectively upon its front and rear walls, and tongues upon the said valve plates engaging over the lateral edges of the said flanges whereby to guide the said plates in their adjustment and maintain their relatively adjacent edges parallel to each other and to the feed roll.

3. A lime marker comprising a hopper having a discharge opening in its bottom, a spout arranged below the hopper in line with the discharge opening thereof, and having forwardly and rearwardly disposed flanges at its upper end underlapping the bottom of the hopper, a feed roll operating in the said discharge opening and within the upper portion of the spout, slotted valve plates slidably mounted upon the said flanges at the upper end of the spout, and having their opposite edges embracing corresponding edges of the said flanges and fastenings passing through the slots of the valve plates and corresponding openings in the bottom of the hopper and the flanges at the upper end of the spout.

In testimony whereof I affix my signature.

THOMAS W. JONES. [L. S.]